June 19, 1962   L. GERACE   3,039,799
HANDRAIL STARTER
Filed Aug. 2, 1960
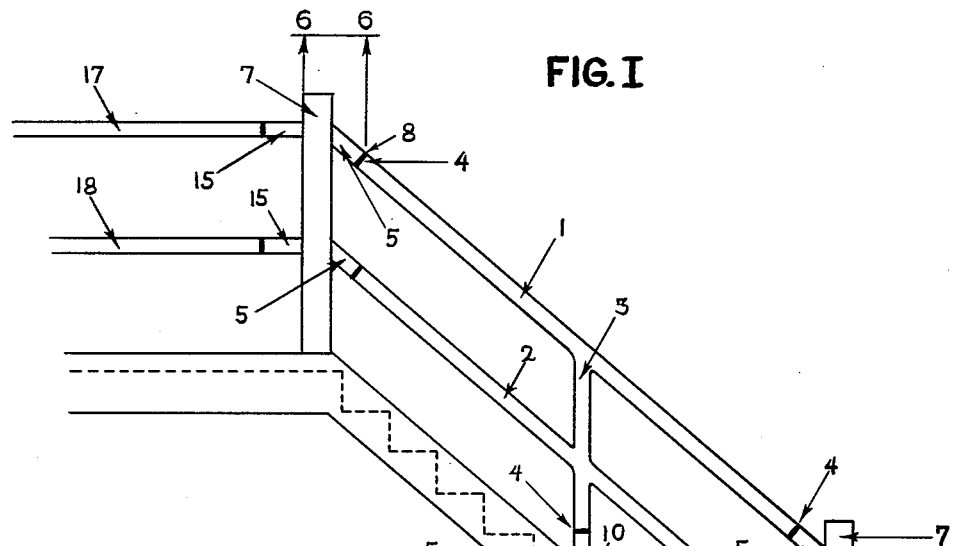
FIG. I
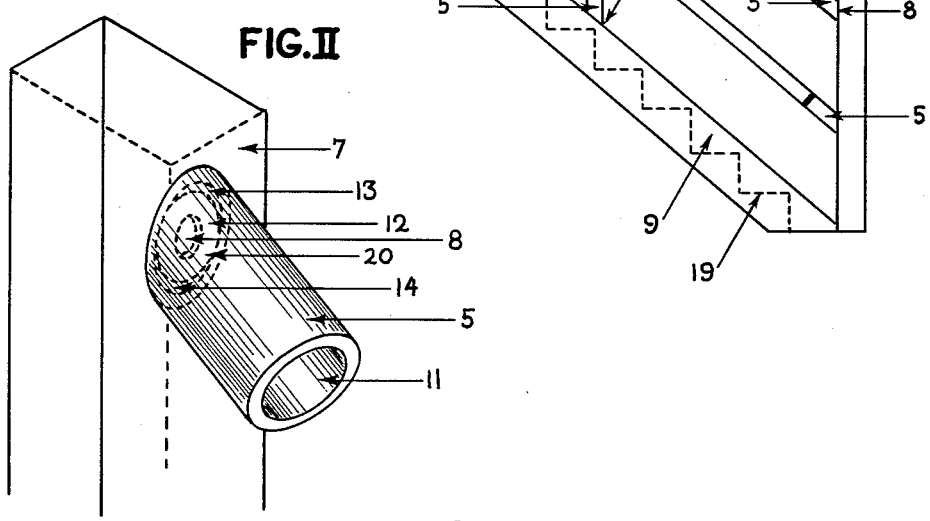
FIG. II
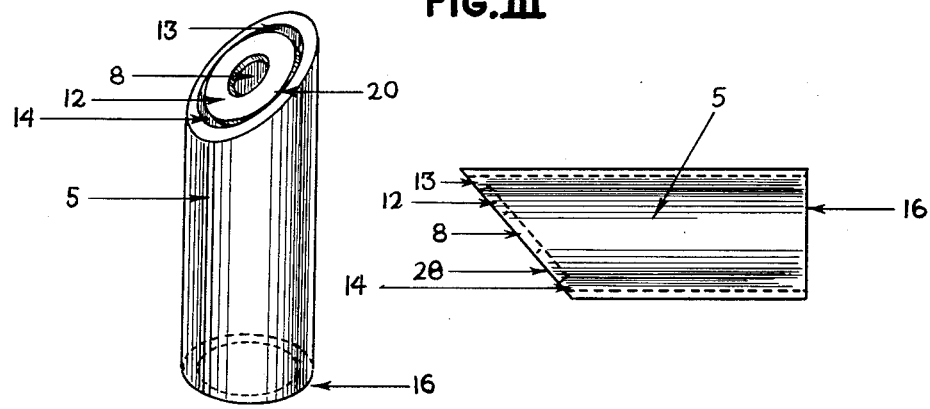
FIG. III

United States Patent Office 3,039,799
Patented June 19, 1962

3,039,799
HANDRAIL STARTER
Lawrence Gerace, 11 Prospect St., Mount Morris, N.Y.
Filed Aug. 2, 1960, Ser. No. 47,022
8 Claims. (Cl. 287—54)

This invention relates to railings and more specifically to stairway railings. The novel concepts of this invention reside in an apparatus and method for expediting the installation of stairway railings.

The installation of handrails along stairways and stair platforms is both time consuming and requires a large degree of skill. This is especially true since it is now the practice to weld the pipe rails around the outside periphery of said pipe rail directly to a newel post or similar structure. This present procedure requires first cutting the pipe so that the angle incline of the pipe conforms to the required angle incline of the stair casing. After the pipe is cut it must be filed and smoothed to remove any burrs or irregularities. The pipe is then placed against the newel post and welded to said newel post around the outer periphery of the pipe. This outer welding is not only time consuming and difficult, but is unsightly when the outer welding is completed. It is then required to file from the surface of the newel post and the outer periphery of the pipe the excess welding material. Since the most used method of removing the excess weld material is by means of a grinding stone, it is most difficult to get to that portion at which the rail pipe and newell post are connected. The result is a connecting portion having an uneven and unsightly appearance.

This invention provides a structure which not only does away with the present need for the above discussed tedious methods, but which also insures the stair contractor a considerable saving of time. The structure of this invention consists of a small portion of rail pipe pre-cut and having at one end the required taper or angle. Thus one end of this rail pipe is open, the opposite end is tapered or pre-cut at an angle predetermined by the required angle of the stairway. This angle-cut end portion has on its base face an aperture or opening. This angle-cut end portion is placed against the newel post and welded to the newel post from the inside of the rail pipe at the end apertured portion. There is no excess weld material to remove since all the welding takes place in the inner portion of the rail pipe. After this rail starter portion is welded to the newel post the remainder of the handrail may be connected to the rail starter portion in any desirable and acceptable manner. This rail starter also has utility at the bottom portion adjacent the stairway risers and as rail starters along the stairway platforms. These later uses will be explained in greater detail in the ensuing discussion. Both the upper and lower extremeties of the handrail may be started using the apparatus and method of this invention.

It is therefore a principal object of this invention to provide a pre-cut structure which is adaptable for use on any stair or handrail.

It is another object of this invention to provide a pre-cut structure which will have a uniform angle cut insuring that the desired angle will be constant throughout the entire stair structure.

It is a further object of this invention to provide a method for installing hand and guard rails along stairways and stair landings at a relatively low cost, in a reasonably short time, and which will result in a smooth appearing, neat, structurally strong rail.

Other objects will become apparent upon a further reading of this disclosure.

The invention will be more easily understood with reference to the enclosed drawing. It should be understood that the drawing is meant to illustrate and not limit the invention.

FIGURE I is an elevation view of a pipe railing, staircase and rail starters of this invention.

FIGURE II is a fragmentary perspective view taken along the line 6—6 of FIGURE I.

FIGURE III is an enlarged detailed view of the angle rail starter of this invention.

Referring first to FIGURE I: illustrated here is pipe-railing including a hand rail 1, a guard rail 2, and vertical support post 3. The hand rail 1 is connected at its lower and upper ends at a point 4 with hand rail starters 5. This connection 4 may be effected by any desirable means such as welding, thread-screw connected, or any other conventional manner. If hand rail 1 is welded to rail starter 5 it is relatively easy to smooth the welded portion since there are no obstructions or close fitting joints and elbows. Rail starter 5 is welded from the inner pipe portion to newel posts 7. All that is required to secure rail starters 5 to newel posts 7 is to place the starters against the newel posts, insert the welding apparatus into the starter 5 at opening 11 and weld at the aperture portion 8 of the starter. Thus a strong connection is effected and a clean, neat outside structure results. Once the starter 5 is welded to the newel posts the remainder of the hand rail 1 is secured to the starters 5 as shown at point 4 in any desirable fashion. It is preferred that these portions be welded or screwed together. The starters 5 described above in relation to hand rail 1 also apply to guard rail 2. Starters 5 in guard rail 2 also connect to newel posts 7 in the same manner as above defined in relation to hand rail 1. The starter 5 also has definite utility at the base of the post 3. Here the starter 5 is welded through the inside aperture to stairway riser 9. The connection again of starter 5 to post 3 is effected in the same manner as described above in relation to hand rail 1. The upper portion of post 3 is then secured to starter 5 by welding or screwing, etc. It, of course, is much easier to file or grind around welded connecting portion 4 than it would be to file or sand at point 10 where the prior art of welding took place. Straight cut rail starters 15 are attached to newel posts 7 in the same manner as angle-cut starters 5. This straight cut starter 15 has an aperture, and it is preferred that outer peripheral openings also be positioned therein for a better welding grip. These crescent-shaped openings provide spaces that may be used as welding portions either together with or separate from aperture 8. The dotted line 19 indicates the stairway steps.

FIGURE II illustrates a close up perspective view of the connection of starter 5 to newel post 7. The welding is easily done by inserting the welding apparatus into rail starter opening 11; the starter is then welded at aperture 8 to newel post 7. The aperture 8 is positioned in a doughnut or washer shaped structure 12 as shown in FIGURE III at base face 20 of said starter. Washer shaped structure 12 is permanently secured to the inner peripheral portion of starter 5 at base face 20. Since structure 12 is of a general configuration different than that of the opening at base face 20, there remains after securing structure 12 to starter 5 not only central aperture 8, but also outer apertures or openings 13 and 14. Openings 8, 13, and 14 provide convenient areas whereby welding starter 5 to newel post 7 is easily accomplished. Any convenient or conventional means may be used to permanently connect washer shaped structure 12 to starter 5. Beside the opening at the center (aperture 8) openings 13 and 14 at the outer periphery of the structure are provided. If it is desired additional welding may take place at these openings so as to provide additional strength to the secured structure. This structure illustrated in FIGURE III is the preferred embodiment. A side view of starter 5 is also illustrated in FIGURE III. End portion 16 may be threaded so that if it is desirable starters 5 and 15 may be screwed into and secured to rails 1, 2, 3, 17 and 18.

In the method of this invention, and by using the starter of this invention, a superior mechanical union between the rails and the posts is achieved. This is attributable to the centralized welding point and the absence of any necessity to file or grind off welding material on the point of connection. The rail starters of this invention may be prefabricated by mass production techniques and hence supplied at relatively low cost. The structure of the starters is such that it is universally applicable to connect pipe railings at a right angle to the newel post or at an inclined angle at the top and bottom portions of a stairway. It is, of course, not necessary that aperture 8 be centralized in starter 5; however, it is preferred that it be centralized. The size of the aperture is preferred to be about $\frac{1}{5}$–$\frac{1}{20}$ the area of the base face of said starter.

The invention as described in the foregoing description and drawings have been given for purposes of illustration, not limitation. Many other modifications and ramifications will naturally suggest themselves to those skilled in the art, based on the disclosure of our basic discovery. These are intended to be comprehended within the scope of this invention.

I claim:

1. A starter structure adapted to connect a pipe railing to a newel post, comprising a cylindrical shaped pipe having a newel post welding end portion and an opposite end pipe railing terminal connecting portion, said newel post welding end portion having a substantially flat end face area adapted to fit adjacent a substantially flat connecting surface, a washer-like structure permanently secured to the inner peripheral wall portion of said cylindrical shaped pipe and positioned on a plane even with and substantially co-extensive with the plane of said flat end face of said newel post welding end, said washer-like end flat face portion having therein an aperture positioned within the inner area of said end face and adapted to provide a locus from which said starter structure can be welded to said newel post.

2. A starter structure adapted to connect a pipe railing to a newel post, comprising a cylindrical shaped pipe having a newel post welding end portion and a pipe railing terminal connecting portion, said newel post welding end tapered at an angle to its longitudinal axis and having a substantially flat end face portion, a washer-like structure permanently secured to the inner peripheral wall portion of said cylindrical shaped pipe and positioned on a plane even with and substantially co-extensive with the plane of said flat end face of said newel post welding end, said washer-like end flat face portion having therein an aperture adapted to provide an opening from which said starter structure can be welded to said newel post.

3. A starter structure adapted to connect a pipe railing to a newel post, comprising a cylindrical shaped pipe having a substantially closed newel post welding end portion and a substantially open pipe railing terminal connecting portion, said newel post welding end tapered at an angle to its longitudinal axis and having a substantially flat end outer face area, said end outer face comprising at its outer peripheral portion an area defined by the wall thickness of said starter structure, a washer-like structure permanently secured to the inner peripheral wall portion of said cylindrical shaped pipe and positioned on a plane even with and substantially co-extensive with the plane of said flat end outer face area, said washer-like end flat face portion having therein an aperture situated within the inner area portion of said end face and adapted to provide an opening from which said starter structure can be welded to said newel post.

4. A starter structure adapted to connect a pipe railing to a newel post, comprising a cylindrical shaped pipe having a substantially closed newel post welding end portion and a substantially open pipe railing terminal connecting portion, said newel post welding end tapered at an angle to its longitudinal axis and having a substantially flat end outer face area, said end outer face comprising at its outer peripheral portion an area defined by the wall thickness of said starter structure, a washer-like structure permanently secured to the inner peripheral wall portion of said cylindrical shaped pipe and positioned on a plane even with and substantially co-extensive with the plane of said flat end outer face area, said washer-like end flat face portion having therein an aperture situated within the inner area portion of said end face and adapted to provide an opening from which said starter structure can be welded to said newel post, said pipe railing terminal connecting portion having a substantially flat end outer face area and adapted to be connected to a pipe railing means.

5. A starter structure adapted to connect a pipe railing to a newel post, comprising a cylindrical shaped pipe having a substantially closed newel post welding end portion and a substantially open pipe railing terminal connecting portion, said newel post welding end tapered at an angle to its longitudinal axis and having a substantially flat end outer face area, said end outer face comprising at its outer peripheral portion an area defined by the wall thickness of said starter structure, a washer-like structure permanently secured to the inner peripheral wall portion of said cylindrical shaped pipe and positioned on a plane even with and substantially co-extensive with the plane of said flat end outer face area, said washer-like structure having therein a substantially centralized opening and peripheral openings separated from and substantially parallel to said centralized opening and said wall portions of said cylindrical shaped pipe, said openings adapted to provide an opening from which said starter structure can be welded to said newel post.

6. A method of connecting a pipe railing to a newel post which comprises: providing a cylindrical shaped pipe having an apertured end face and an opposite open end face, said aperture extending from the internal portion of said cylindrical shaped pipe to the outer atmosphere, positioning said apertured face immediately adjacent the face of said newel post, internally of said pipe welding said rail starter at said apertured portion to the face of said newel post, said welding provided only at a locus within the area encircled by the inner peripheral wall portion of said cylindrical shaped pipe, positioning an additional pipe portion adjacent said opposite open end face in such a manner that the outer peripheral portion of said additional pipe portion and said opposite open end face are in alignment, and permanently securing said additional pipe portion to said opposite open end face.

7. A method of connecting a pipe railing to a newel post which comprises: providing a cylindrical shaped pipe having an apertured end face and an opposite open end face, said aperture positioned in the center portion of said apertured end face and extending from the internal portion of said cylindrical shaped pipe to the outer atmosphere, positioning said apertured face immediately adjacent the face of said newel post, internally of said pipe welding said rail starter at only said centrallized apertured portion to the face of said newel post, providing a rigid metal portion immediately intermediate said welded portion and the internal wall portion of said cylindrical shaped pipe, positioning an additional pile portion adjacent said opposite open end face in such a manner that the outer peripheral portion of said additional pipe portion and said opposite open end face are in alignment, and permanently securing said additional pipe portion to said opposite open end face.

8. A method of connecting a pipe railing to a newel post which comprises: providing a cylindrical shaped pipe having an apertured end face and an opposite open end face, said apertures positioned in both the center portion of said apertured end face and at points parallel to the outer peripheral portion of said cylindrical shaped pipe, said apertures extending completely through the wall portion of said apertured end face so that the internal portion of said cylindrical shaped pipe is in communication with the atmosphere, positioning said apertured face immediately adjacent the face of said newel post, internally of said pipe welding said rail starter at said apertured portions to the face of said newel post, said welded portion securing said cylindrical shaped pipe to said newel post at both the center and the inner peripheral wall portion of said cylindrical shaped pipe, positioning an additional pipe portion adjacent said opposite open end face in such a manner that the outer peripheral portion of said additional pipe portion and said opposite open end face are in alignment, and permanently securing said additional pipe portion to said opposite open end face.

References Cited in the file of this patent

UNITED STATES PATENTS

| | | |
|---|---|---|
| 1,457,183 | Mitchell | May 29, 1923 |
| 2,024,782 | Schwinn | Dec. 17, 1935 |
| 2,091,982 | Hart | Sept. 7, 1937 |
| 2,101,707 | Ewing | Dec. 7, 1937 |
| 2,780,440 | Krieger | Feb. 5, 1957 |